H. HESS.
BALL BEARING MOUNTING.
APPLICATION FILED APR. 24, 1906.
989,258.
Patented Apr. 11, 1911.
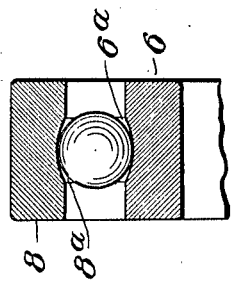
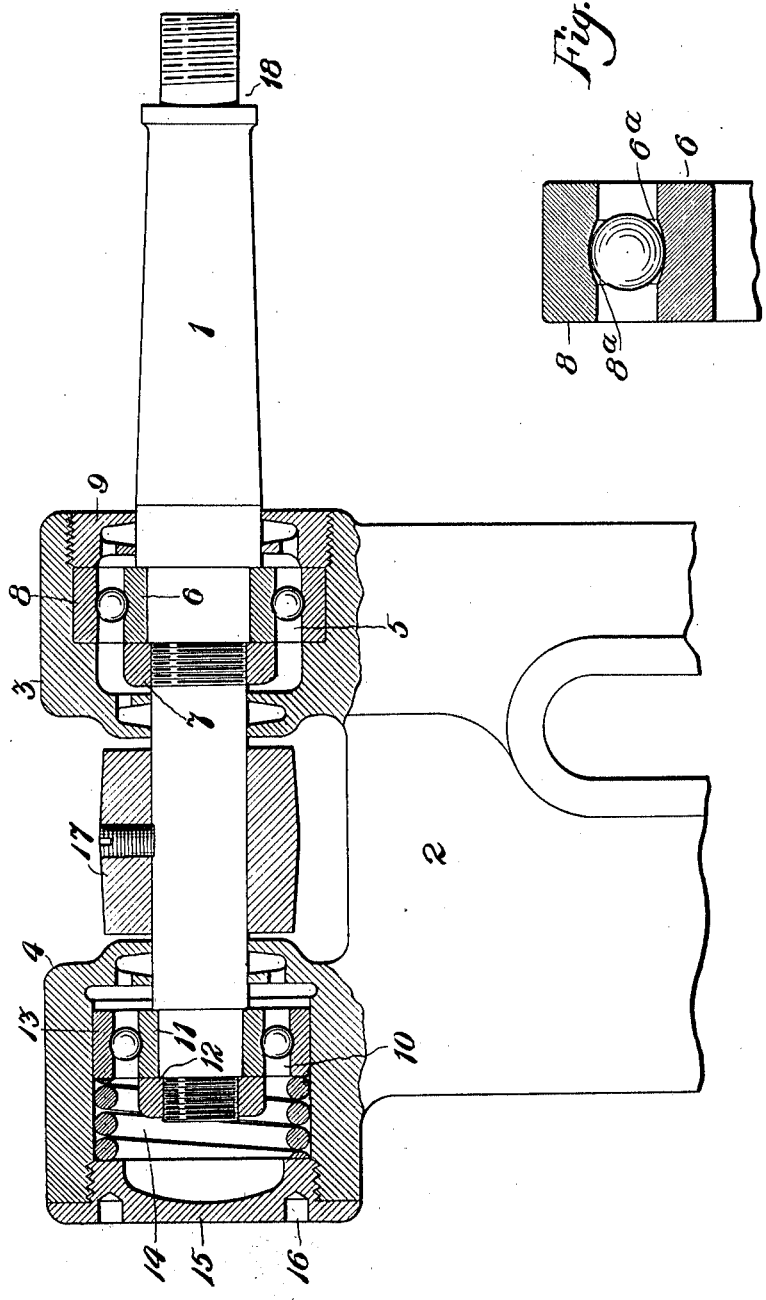
WITNESSES
Lilian Brock.
Nancy E. Costello.
INVENTOR
Henry Hess,
by Brockerlmith
Att'ys.

UNITED STATES PATENT OFFICE.

HENRY HESS, OF PHILADELPHIA, PENNSYLVANIA.

BALL-BEARING MOUNTING.

989,258.

Specification of Letters Patent.

Patented Apr. 11, 1911.

Application filed April 24, 1906. Serial No. 313,444.

*To all whom it may concern:*

Be it known that I, HENRY HESS, a citizen of the United States, and resident of Philadelphia, in the State of Pennsylvania, have invented a new and useful Ball-Bearing Mounting, of which the following is a specification.

In ball bearings when they are originally assembled there may be, on account of inaccuracies in the bearing members, variation in size of the balls, or for other reasons, more or less radial play of the race-rings. Such radial play may also occur after the bearing has been in use for some time by reason of wear. Ball bearings are frequently used to mount revoluble elements which must run as truly as possible, and it is therefore desirable to provide means for taking up this radial play in ball bearings when used in such mountings.

My invention relates to means for taking up such radial play.

In the accompanying drawing, which illustrates an exemplifying structure in which my invention is embodied, Figure 1 is a vertical longitudinal section of the mounting of a spindle for an internal grinder; and Fig. 2 is an enlarged section through the two race-rings of one ball bearing.

In the exemplification I show my invention as applied to the mounting of an internal-grinder spindle, in which steady and true rotation is highly important. The special application of the invention is, however, obviously non-essential.

1 is a rotative spindle; 2, a casting, forming a support for the spindle; 3, 4, journal boxes, in the present instance integral with casting 2; 5, a complete ball bearing, generally of the non-adjustable ring type, of which the inner race-ring 6 encircles the spindle 1 and is secured against a shoulder thereon by a nut 7, and the outer race-ring 8 rests in a suitable socket formed in box 3, and is there secured by a nut 9; 10, another similar ball bearing, of which the inner ring 11 encircles the spindle and is secured against a shoulder thereon by a nut 12, and the outer ring 13 rests in a cylindrical bore in box 4, and is free to move therein longitudinally of the spindle; 14, a spring, conveniently of helical form, of which one end bears against the outer bearing ring 13, and the other end against a nut 15, by which the said spring is retained within box 4, and forced against the bearing ring 13; 17, a driving pulley secured to the spindle; and 18, a shoulder and screw-thread on the spindle for attaching thereto a grinding tool.

The ball bearings used may be assembled by the eccentric displacement method or any other suitable way.

As seen clearly in Fig. 2, the ball races of the two bearings have in cross-section the shape of an arc of a circle, so that, if for any reason the balls run loosely in their normal path in the races—that is, in a plane intersecting the greatest radial diameter of the outer race and the least radial diameter of the inner race—movement of one of the race-rings longitudinally of its axis in relation to the other will cause the balls to run in parts of the races which provide a smaller path for the balls, and therefore any radial play is taken up.

In Fig. 1, the pressure of spring 14 against the outer bearing ring 13 urges the inner ring 11 and spindle 1 toward the right. The inner ring 6 of the other bearing thereupon tends to move to the right, until stopped by the balls, which engage also the outer, fixed bearing ring 8. The balls in the two bearings are thus always urged to follow a path in the races smaller than the ordinary, normal ball-contact points, and any tendency to radial play, however caused, is perfectly taken up.

The present invention is susceptible to many variations.

The separate boxes for supporting the two bearings are provided in the present exemplification only in order to allow placing the pulley 17 between the bearings; in many cases the mountings for the two bearings may be much more closely related, or in fact, practically one structure.

What I claim is:

1. The combination of a rotary shaft, a stationary support, two non-adjustable ball bearings each comprising an inner and an outer bearing ring provided with radially-opposite races of curved cross-section, and means acting upon the support and a bearing member to maintain the shaft in true rotative alinement.

2. The combination of a shaft, a housing, a non-adjustable ball bearing comprising an inner bearing ring fast on the shaft and an outer bearing ring fast in the housing, a second non-adjustable ball bearing comprising an inner bearing ring fast on the shaft and an outer bearing ring loose in the housing, the two rings of each of the ball bearings being provided with radially opposite races of curved cross-section an abutment in the housing, and a spring compressed between the abutment and the loose bearing ring.

3. The combination of a shaft, a housing, a non-adjustable ball bearing comprising an inner bearing ring fast on the shaft and an outer bearing ring fast in the housing, a second non-adjustable ball bearing comprising an inner bearing ring fast on the shaft and an outer bearing ring loose in the housing, the two rings of each of the ball bearings being provided with radially opposite races of curved cross-section, an abutment in the housing, and a drive pulley on the shaft between the bearings.

In testimony whereof I have affixed my signature in the presence of two witnesses.

HENRY HESS.

Witnesses:
THEO. H. McCALLA,
C. H. McCALLA.